(12) United States Patent
Kruecker et al.

(10) Patent No.: US 12,465,331 B2
(45) Date of Patent: Nov. 11, 2025

(54) METHODS AND SYSTEMS FOR VENTILATION MANAGEMENT USING LUNG ULTRASOUND (71) Applicant: KONINKLIJKE PHILIPS N.V., Eindhoven (NL)

(72) Inventors: Jochen Kruecker, Andover, MA (US); Seyedali Sadeghi, Melrose, MA (US); Shyam Bharat, Arlington, MA (US); Claudia Errico, Medford, MA (US); Samer Bou Jawde, Boston, MA (US); Roberto Buizza, Malden, MA (US); Balasundar Iyyavu Raju, North Andover, MA (US); Sven Peter Prevrhal, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 140 days.

(21) Appl. No.: 18/571,811

(22) PCT Filed: Jun. 21, 2022

(86) PCT No.: PCT/EP2022/066802
§ 371 (c)(1),
(2) Date: Dec. 19, 2023

(87) PCT Pub. No.: WO2022/268761
PCT Pub. Date: Dec. 29, 2022

(65) Prior Publication Data
US 2024/0285259 A1 Aug. 29, 2024

Related U.S. Application Data (60) Provisional application No. 63/213,935, filed on Jun. 23, 2021.

(51) Int. Cl.
*A61B 8/00* (2006.01)
*A61B 8/08* (2006.01)
*G16H 50/30* (2018.01)

(52) U.S. Cl.
CPC ........... *A61B 8/5223* (2013.01); *A61B 8/08* (2013.01); *A61B 8/463* (2013.01); *G16H 50/30* (2018.01)

(58) Field of Classification Search
CPC ......... A61B 8/5223; A61B 8/08; A61B 8/463; G16H 50/30; A61M 16/026;
(Continued)

(56) References Cited

U.S. PATENT DOCUMENTS 7,774,055 B1 * 8/2010 Min .................. A61B 5/0538
600/300
2014/0236035 A1 8/2014 Milne et al.
(Continued)

FOREIGN PATENT DOCUMENTS

WO 2008073560 A2 6/2008
WO 2022144177 A2 7/2022

OTHER PUBLICATIONS

International Search Report and Written Opinion for PCT/EP2022/066802; Mailing date: Sep. 15, 2022, 9 pages.
(Continued)

*Primary Examiner* — Bo Joseph Peng (57) ABSTRACT

A lung injury monitoring system (200) configured to monitor a patient's lungs during ventilation, comprising: an ultrasound device (280) configured to obtain an ultrasound image of the patient's lungs during ventilation of the patient; a processor (220) configured to: (i) receive the obtained ultrasound image; (ii) determine a ventilation phase of the ventilator; (iii) analyze the received ultrasound image; and (iv) determine a risk score for a potential ventilator-associ-
(Continued)

ated lung injury (VALI); and a user interface (240) configured to display the determined risk score for the potential VALI.

15 Claims, 8 Drawing Sheets

(58) Field of Classification Search
CPC .............. A61M 16/0066; A61M 16/06; A61M 2205/3693; A61M 2205/502; A61M 2210/1039
See application file for complete search history.

(56) References Cited

U.S. PATENT DOCUMENTS

| | | | | |
|---|---|---|---|---|
| 2014/0366874 | A1* | 12/2014 | Deutsch | A61B 5/6853 128/202.13 |
| 2015/0150503 | A1 | 6/2015 | Pamnani et al. | |
| 2018/0286518 | A1* | 10/2018 | Raju | A61B 5/4848 |
| 2020/0360690 | A1* | 11/2020 | Evans | A61N 1/0456 |
| 2021/0015453 | A1* | 1/2021 | Toporek | A61B 8/54 |

OTHER PUBLICATIONS

Jambrik, Z. et al., "B-Lines Quantify the Lung Water Content: A Lung Ultrasound Versus Lung Gravimetry Study in Acute Lung Injury", Ultrasound in Medicine & Biology, 2010, vol. 36, Issue 12, pp. 2004-2010.

Vetrugno, L. et al., "Mechanical ventilation weaning issues can be counted on the fingers of just one hand: part 2", Ultrasound J, 2020, vol. 12:15, 8 pages.

Bouhemad, B. et al., "Ultrasound for "Lung Monitoring" of Ventilated Patients", Anesthesiology, 2015, vol. 122, No. 2, 11 pages.

Conway, H. et al., "Personalizing Invasive Mechanical Ventilation Strategies in Coronavirus Disease 2019 (COVID-19) Associated Lung Injury: The Utility of Lung Ultrasound", Journal of Cardiothoracic and Vascular Anesthesia, 2020, vol. 34, pp. 2571-2574.

Lim, S.Y. et al., "Effects of Ultralow-Tidal-Volume Ventilation under Veno-Venous Extracorporeal Membrane Oxygenation in a Porcine Model with Ventilator-Induced Lung Injury", Membranes 2020, vol. 10, 12 pages.

Gammon, R.B. et al., "Pulmonary Barotrauma in Mechanical Ventilation. Patterns and risk factors", Chest, 1992, vol. 102, Issue 2, pp. 568-572.

Brogi, E. et al., "Thoracic ultrasound for pleural effusion in the intensive care unit: a narrative review from diagnosis to treatment", Critical Care, 2017, vol. 21:325, 11 pages.

Lee, F.C.Y., "Lung ultrasound—a primary survey of the acutely dyspneic patient", Journal of Intensive Care, 2016, vol. 4:57, 13 pages.

Mojoli, F. et al., "Lung Ultrasound for Critically Ill Patients", Am J Respir Crit Care Med, 2019, vol. 199, Issue 6, pp. 701-714.

* cited by examiner

METHODS AND SYSTEMS FOR VENTILATION MANAGEMENT USING LUNG ULTRASOUND

CROSS-REFERENCE TO PRIOR APPLICATIONS

This application is the U.S. National Phase application under 35 U.S.C. § 371 of International Application No. PCT/EP2022/066802, filed on Jun. 21, 2022, which claims the benefit of U.S. Provisional Patent Application No. 63/213,935, filed on Jun. 23, 2021. These applications are hereby incorporated by reference herein.

FIELD OF THE INVENTION

The present disclosure is directed generally to methods and systems for monitoring a patient's lungs during ventilation using ultrasound.

BACKGROUND

Ventilators are widely used to treat patients with impaired lung function or respiratory failure, triggered by head injuries, stroke, lung conditions such as acute respiratory distress syndrome (ARDS), pneumonia, or chronic obstructive pulmonary disease (COPD), and a wide variety of other conditions. Ventilation is also regularly used in patients under general anesthesia.

However, there are several risks associated with mechanical ventilation, including the risk of infections such as pneumonia and the risk of ventilator-associated lung injury (VALI). Among the potential lung injuries, two VALI are of particular concern. The first, atelectotrauma, is also referred to as cyclic atelectasis or repeated alveolar collapse and expansion (RACE). Atelectotrauma can be caused if diseased parts of the lung repeatedly collapse at the end of expiration due to the low mechanical ventilation pressure, and then reopen again with higher ventilation pressure during inspiration. The repeated opening and collapse of the alveoli leads to shear stresses that can damage the alveoli.

The second VALI is alveolar overdistension, or volutrauma. Alveolar overdistension is caused by excessive air forced into the lung with too much pressure, especially in the setting of a partially consolidated or injured lung, which leaves only a smaller lung volume available to take in the air. In the reduced lung volume, the alveoli will over-stretch, leading to membrane rupture and inflammation.

The risks of VALI are often localized to some parts of the lung. For example, in a partially consolidated lung, mainly the healthy (i.e., un-consolidated) lung is at risk of overdistension because it will take in most of the volume provided by the ventilator. Conversely, cyclic atelectasis will occur mainly in that part of the lung that is partially fluid-filled, and not in a healthy part of the lung. Indeed, in a diseased lung, some parts of the lung may respond very differently to a given tidal volume or airway pressure than other parts, thus creating risks of local lung injury that cannot be assessed by the available global measures.

Ventilator operators such as a respiratory therapist or physician may determine ventilator settings to reduce the risks of VALI as much as possible. Indeed, ventilator operators have various options to control the settings of the ventilator to ensure adequate oxygen delivery and carbon dioxide removal while minimizing risk of lung injury. Currently, however, operators have limited means to determine the risks for a given ventilated patient to develop ventilator-associated lung injury. In particular, the feedback and measurements that the operator can obtain, are global for the whole lung, including e.g. ventilator settings such as the tidal volume in pressure-controlled mode, or peak inspiratory pressure (PIP) in volume-controlled mode and respiratory mechanics such as overall respiratory resistance and compliance.

Lung ultrasound (LUS) is a powerful imaging modality that can help to identify and manage lung disease and conditions, including pneumonia, interstitial lung diseases, pneumothorax, lung consolidations, and pleural effusions. In particular, the presence of so-called "B-lines" in lung ultrasound images indicates a loss of aeration and can be suggestive of pneumonia, pulmonary edema or acute respiratory distress syndrome (ARDS). Similarly, the lack of "lung sliding" or the appearance of the "lung point sign" or "barcode/stratosphere sign" (in M-mode) are indicative of pneumothorax, which is characterized by a lack of lung sliding. In the normal lung, however, the visceral and parietal pleura are sliding relative to one another with respiration, which can be observed as "lung sliding" in ultrasound.

Current lung ultrasound techniques for ventilator management, however, are highly manual and are typically global for the whole lung. The use of ultrasound imaging can be ineffective and inefficient, thereby failing to identify and/or diagnose VALI. While lung ultrasound has been shown to identify certain lung diseases accurately, no processing techniques exist to use lung ultrasound for identification or quantification of the risk of VALI, or to inform the ventilator operator of the risks and possible actions to reduce the risks. These limitations can result in significant lung injuries and can possibly lead to death.

SUMMARY OF THE INVENTION

Accordingly, there is a need for ventilation management systems that monitor and determine a risk score for ventilator-associated lung injury using ultrasound techniques.

The present disclosure is directed to inventive methods and systems for monitoring a patient's lungs during ventilation using ultrasound imaging. Various embodiments and implementations herein are directed to a ventilator system comprising an ultrasound device configured to obtain an ultrasound image of the patient's lungs during ventilation of the patient. The system determines a ventilation phase of the ventilator, analyzes the received ultrasound image, and determines, based on the analysis, a risk score for a potential ventilator-associated lung injury (VALI). The system can then display, via a user interface of the lung injury monitoring system, the risk score of the potential VALI.

According to one embodiment, analysis of a received lung ultrasound image from a ventilated patient comprises: (i) labeling the received ultrasound image as an inspiratory or expiratory image based on the determined ventilation phase of the ventilator; (ii) determining a number of B-lines in the labeled received ultrasound image, where the determined number of B-lines in the labeled received ultrasound image comprises a maximum and/or average number of B-lines; (iii) receiving an updated ultrasound image in the other of an inspiratory or expiratory ventilation phase of the ventilator, and labeling the updated ultrasound image as the other of the inspiratory and expiratory ventilation phase of the ventilator; (iv) determining a number of B-lines in the updated ultrasound image, where the determined number of B-lines in the updated ultrasound image comprises a maximum and/or average number of B-lines; and (v) comparing the number of determined B-lines in the labeled received ultrasound image to the number of determined B-lines in the updated ultrasound image to identify a ratio of maximum and/or average number of B-lines in an inspiratory ventilation stage relative to an expiratory ventilation stage, where the ratio is a metric indicative of VALI.

According to another embodiment, the analysis of the received ultrasound image by the lung injury comprises: (i) determining, from the determined ventilation phase of the ventilator, that full expiration of the patient's lungs has been reached; (ii) identifying a pleural line in a received ultrasound image after full expiration of the patient's lungs has been reached; (iii) identifying, if a pleural line is identified, a parietal pleura ($R_p$) and a visceral pleura ($R_v$) in the received ultrasound image; (iv) receiving, from the ultrasound device, an updated ultrasound image; (v) identifying a pleural line in the updated ultrasound image and identifying a parietal pleura ($R_p$) and a visceral pleura ($R_v$) in the updated ultrasound image; (vi) determining, by comparing the parietal pleura and visceral pleura in the received ultrasound image and updated ultrasound image, a parietal displacement vector ($d_p$) and a visceral displacement vector ($d_v$); (vii) determining a relative displacement ($d_t$) by subtracting $d_p$ from $d_v$; and (viii) calculating, from $d_t$, a metric indicative of VALI.

Generally in one aspect, a lung injury monitoring system configured to monitor a patient's lungs during ventilation is provided. The system includes: an ultrasound device configured to obtain an ultrasound image of the patient's lungs during ventilation of the patient; a processor configured to: (i) receive the obtained ultrasound image; (ii) determine a ventilation phase of the ventilator; (iii) analyze the received ultrasound image; and (iv) determine a risk score for a potential ventilator-associated lung injury (VALI); and a user interface configured to display the risk score for the potential VALI.

According to an embodiment, analyzing by the processor comprises: (i) labeling the received ultrasound image as an inspiratory or expiratory image based on the determined ventilation phase of the ventilator; (ii) determining a number of B-lines in the labeled received ultrasound image, wherein the determined number of B-lines in the labeled received ultrasound image comprises a maximum and/or average number of B-lines; (iii) receiving an updated ultrasound image in the other of an inspiratory or expiratory ventilation phase of the ventilator, and labeling the updated ultrasound image as the other of the inspiratory and expiratory ventilation phase of the ventilator; (iv) determining a number of B-lines in the updated ultrasound image, wherein the determined number of B-lines in the updated ultrasound image comprises a maximum and/or average number of B-lines; and (v) comparing the number of determined B-lines in the labeled received ultrasound image to the number of determined B-lines in the updated ultrasound image to identify a ratio of maximum and/or average number of B-lines in an inspiratory ventilation stage relative to an expiratory ventilation stage, wherein the ratio is a metric indicative of VALI.

According to an embodiment, the identified ratio is indicative of a potential VALI if the identified ratio is above a predetermined threshold, and wherein the identified ratio is indicative of a healthy lung if the identified ratio is below a predetermined threshold.

According to an embodiment, analyzing by the processor comprises: (i) determining, from the determined ventilation phase of the ventilator, that full expiration of the patient's lungs has been reached; (ii) identifying a pleural line in a received ultrasound image after full expiration of the patient's lungs has been reached; (iii) identifying, if a pleural line is identified, a parietal pleura ($R_p$) and a visceral pleura ($R_v$) in the received ultrasound image; (iv) receiving, from the ultrasound device, an updated ultrasound image; (v) identifying a pleural line in the updated ultrasound image and identifying a parietal pleura ($R_p$) and a visceral pleura ($R_v$) in the updated ultrasound image; (vi) determining, by comparing the parietal pleura and visceral pleura in the received ultrasound image and updated ultrasound image, a parietal displacement vector ($d_p$) and a visceral displacement vector ($d_v$); (vii) determining a relative displacement ($d_t$) by subtracting $d_p$ from $d_v$; (viii) calculating, from $d_t$, a metric indicative of VALI.

According to an embodiment, calculating comprises determining a quantitative lung sliding parameter such as amplitude, velocity, or phase lag of displacement.

According to an embodiment, the VALI is atelectotrauma and/or overdistension.

According to an embodiment, the user interface is further configured to display one or more of monitoring or demographic information about the patient.

According to another aspect a method for monitoring a patient's lungs during ventilation using a lung injury monitoring system is provided. The method includes: (i) receiving, from an ultrasound device of the lung injury monitoring system, an ultrasound image of the patient's lungs during ventilation of the patient by a ventilator of the lung injury monitoring system; (ii) determining, by a processor of the lung injury monitoring system, a ventilation phase of the ventilator; (iii) analyzing, using the processor of the lung injury monitoring system, the received ultrasound image; and (iv) determining, based on the analysis, a risk score for a potential ventilator-associated lung injury (VALI).

According to an embodiment, analyzing the received ultrasound image comprises: (i) labeling the received ultrasound image as an inspiratory or expiratory image based on the determined ventilation phase of the ventilator (ii) determining a number of B-lines in the labeled received ultrasound image, wherein the determined number of B-lines in the labeled received ultrasound image comprises a maximum and/or average number of B-lines; (iii) receiving an updated ultrasound image in the other of an inspiratory or expiratory ventilation phase of the ventilator, and labeling the updated ultrasound image as the other of the inspiratory and expiratory ventilation phase of the ventilator; (iv) determining a number of B-lines in the updated ultrasound image, wherein the determined number of B-lines in the updated ultrasound image comprises a maximum and/or average number of B-lines; and (v) comparing the number of determined B-lines in the labeled received ultrasound image to the number of determined B-lines in the updated ultrasound image to identify a ratio of maximum and/or average number of B-lines in an inspiratory ventilation stage relative to an expiratory ventilation stage, wherein the ratio is a metric indicative of VALI.

According to an embodiment, analyzing the received ultrasound image comprises: (i) determining, from the determined ventilation phase of the ventilator, that full expiration of the patient's lungs has been reached; (ii) identifying a pleural line in a received ultrasound image after full expiration of the patient's lungs has been reached; (iii) identifying, if a pleural line is identified, a parietal pleura ($R_p$) and a visceral pleura ($R_v$) in the received ultrasound image; (iv) receiving, from the ultrasound device, an updated ultrasound image; (v) identifying a pleural line in the updated ultrasound image and identifying a parietal pleura ($R_p$) and a visceral pleura ($R_v$) in the updated ultrasound image; (vi)

determining, by comparing the parietal pleura and visceral pleura in the received ultrasound image and updated ultrasound image, a parietal displacement vector ($d_p$) and a visceral displacement vector ($d_v$); (vii) determining a relative displacement ($d_r$) by subtracting $d_p$ from $d_v$; (viii) calculating, from $d_r$, a metric indicative of VALI.

According to an embodiment, the method further includes displaying, via a user interface of the lung injury monitoring system, the determined risk score for the potential VALI. According to an embodiment, the user display further displays one or more of monitoring or demographic information about the patient.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a ventilator system and method. More generally, Applicant has recognized and appreciated that it would be beneficial to provide a ventilator system and method that detects ventilator-associated lung injury using ultrasound techniques. For example, the ventilator system comprises an ultrasound device configured to obtain an ultrasound image of the patient's lungs during ventilation of the patient. The system determines a ventilation phase of the ventilator, analyzes the received ultrasound image, and determines, based on the analysis, a risk score for a potential ventilator-associated lung injury (VALI). The system can then display, via a user interface of the lung injury monitoring system, the risk score for the potential VALI.

The ventilator system and method disclosed or otherwise envisioned herein provides numerous advantages over the prior art. Providing a ventilator that enables the detection and diagnosis of ventilator-associated lung injury using ultrasound techniques can prevent serious lung injuries, improve patient outcomes, and potentially save lives.

Figure 1:
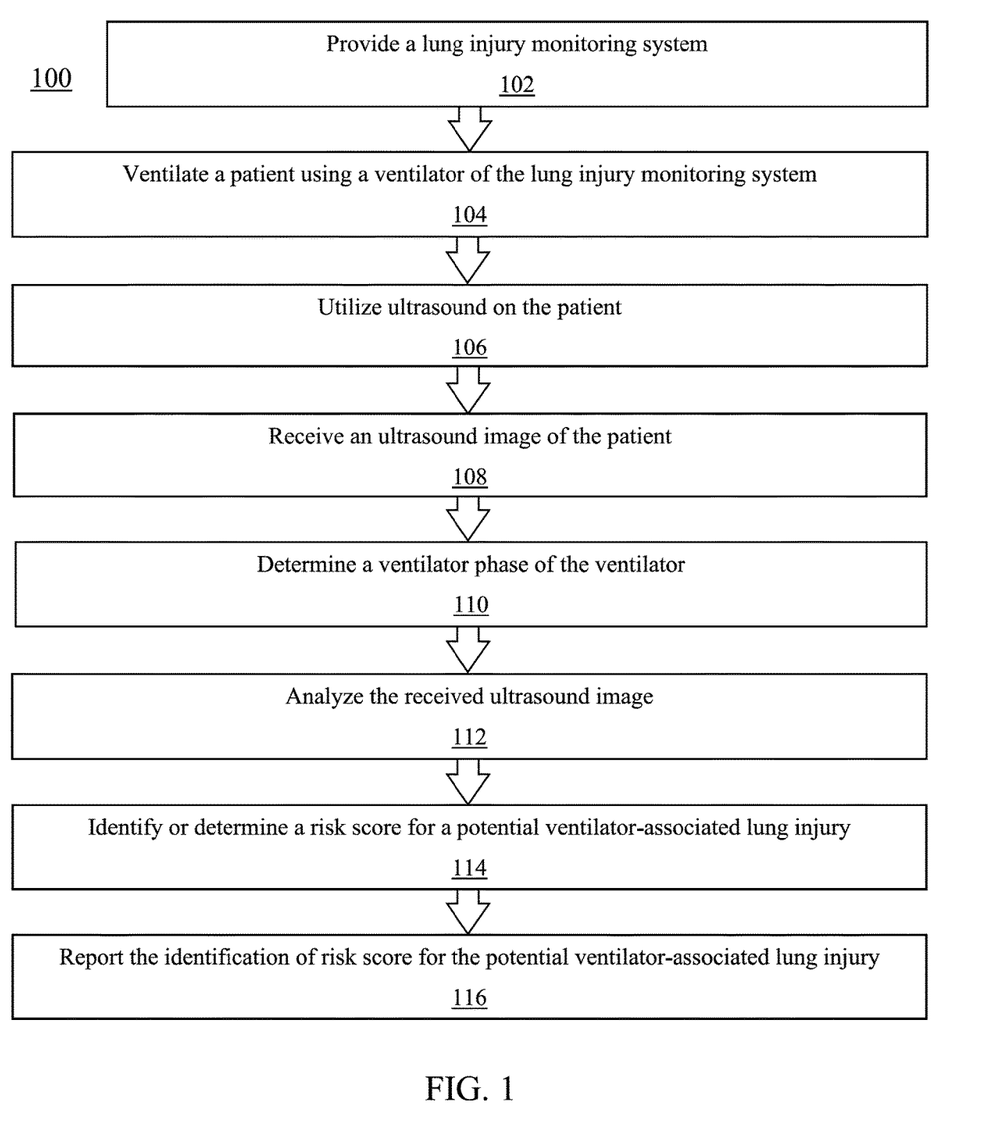
FIG. 1 is a flowchart of a method for monitoring a patient's lungs during ventilation using a lung injury monitoring system, in accordance with an embodiment.

Referring to FIG. 1, in one embodiment, is a flowchart of a method 100 for monitoring a patient's lungs during ventilation using a lung injury monitoring system. The methods described in connection with the figures are provided as examples only, and shall be understood not to limit the scope of the disclosure. The lung injury monitoring system can be any of the systems described or otherwise envisioned herein. The lung injury monitoring system can be a single system or multiple different systems.

Figure 2:
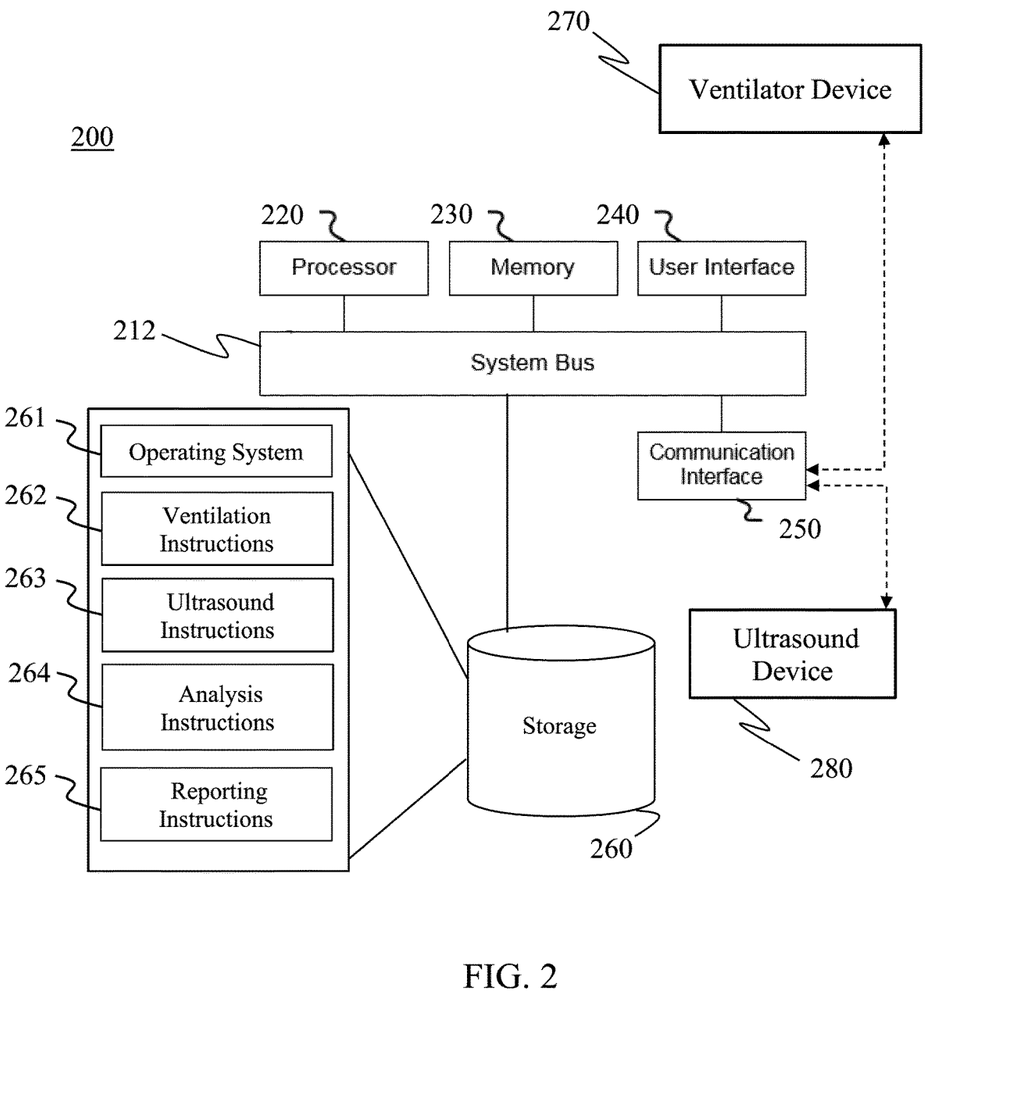
FIG. 2 is a schematic representation of a lung injury monitoring system, in accordance with an embodiment.

At step 102 of the method, a lung injury monitoring system 200 is provided. Referring to an embodiment of a lung injury monitoring system 200 as depicted in FIG. 2, for example, the system comprises one or more of a processor 220, memory 230, user interface 240, communications interface 250, storage 260, ventilator device 270, and ultrasound device 280, interconnected via one or more system buses 212. It will be understood that FIG. 2 constitutes, in some respects, an abstraction and that the actual organization of the components of the system 200 may be different and more complex than illustrated. Additionally, lung injury monitoring system 200 can be any of the systems described or otherwise envisioned herein. Other elements and components of system 200 are disclosed and/or envisioned elsewhere herein.

At step 104 of the method, the ventilator device 270 of the lung injury monitoring system 200 is utilized to ventilate a patient (not shown). The ventilator device can be any device suitable to ventilate a patient for any reason requiring ventilation. The setting for the lung injury monitoring system can be a hospital setting, a nursing home setting, a long-term care setting, a home setting, and/or any other healthcare setting. One or more parameters of the ventilator device can be set, adjusted, preprogrammed, or otherwise determined by a healthcare professional.

At step 106 of the method, a healthcare professional utilizes an ultrasound device 280 of the lung injury monitoring system 200 to perform ultrasound imaging on a patient (not shown). The ultrasound device can be any device suitable to obtain or otherwise receive an ultrasound image from the patient. One or more parameters of the ultrasound device can be set, adjusted, preprogrammed, or otherwise determined by a healthcare professional.

At step 108 of the method, the lung injury monitoring system receives an ultrasound image from the ultrasound imaging device. The received ultrasound image may be a single image or multiple images, and may comprise imaging of a single portion of the patient and/or the patient's lung or lungs, or multiple portions of the patient and/or the patient's lung or lungs. The image may be obtained during any stage of ventilation. The received ultrasound image can be utilized immediately or can be stored in local or remote storage for subsequent use.

At step 110 of the method, the lung injury monitoring system determines a ventilation phase of the ventilator. This may be determined in conjunction with obtaining the ultrasound image in step 108 of the method. For example, the system may determine the ventilation phase of the ventilator, such as what point along the respiratory cycle the patient and/or ventilator is operating, when the ultrasound image was obtained or received. The ventilation phase of the ventilator can be determined using a wide variety of mechanisms. For example, this can be achieved using one or multiple trigger signals from the ventilator indicating the beginning of a respiratory cycle, e.g. starting with inspiration. According to an embodiment, one full respiration cycle can be divided into inspiration and expiration phases, either using multiple trigger signals from the ventilator that indicate the beginning of the respective phase, or using a single trigger and a fixed ratio (e.g. 50:50 or 40:60) of inspiration vs. expiration time during each cycle. The system may monitor the respiratory phase and/or ventilation phase using a signal from the ventilator, and may determine that an ultrasound image is more properly obtained, or a received ultrasound image is more properly used, when the respiratory phase and/or ventilation phase is at a desirable stage for the subsequent analyses described or otherwise envisioned herein.

At step 112 of the method, the lung injury monitoring system analyzes the received ultrasound image. According to an embodiment, a processor 220 of the lung injury monitoring system 200 analyzes the image. There are numerous embodiments of the analysis of the image by the system, and several of these embodiments are described in greater detail below. According to an embodiment, the output of the analysis at step 112 of the method is a metric, ratio, or other data that enables identification or diagnosis of possible lung injury. This output can be utilized immediately or can be stored in local or remote storage for subsequent use.

At step 114 of the method, the lung injury monitoring system uses the output of the analysis from step 112 of the method to determine a risk score for a potential ventilator-associated lung injury (VALI). According to an embodiment, the system utilizes the output metric, ratio, or other data to identify, determine a risk score for, and/or diagnose possible lung injury. There are numerous embodiments of methods and approaches for the identification, risk scoring, and/or diagnosis of possible lung injury, and several of these embodiments are described in greater detail below.

At optional step 116 of the method, the lung injury monitoring system displays or otherwise provides the identification, risk scoring, and/or diagnosis of the possible VALI using a user interface 240. The user interface may be any method or component sufficient to communicate the information to a user. According to an embodiment, the system may display a report on the user interface or display of the system. The display may comprise information about the identification, risk scoring, and/or diagnosis of the possible VALI, information about the patient, information about demographic data regarding the patient, information about monitoring or vital sign data regarding the patient, and/or other information. The report may be communicated by wired and/or wireless communication to another device. For example, the system may communicate the report to a mobile phone, computer, laptop, wearable device, and/or any other device configured to allow display and/or other communication of the report.

Figure 3:
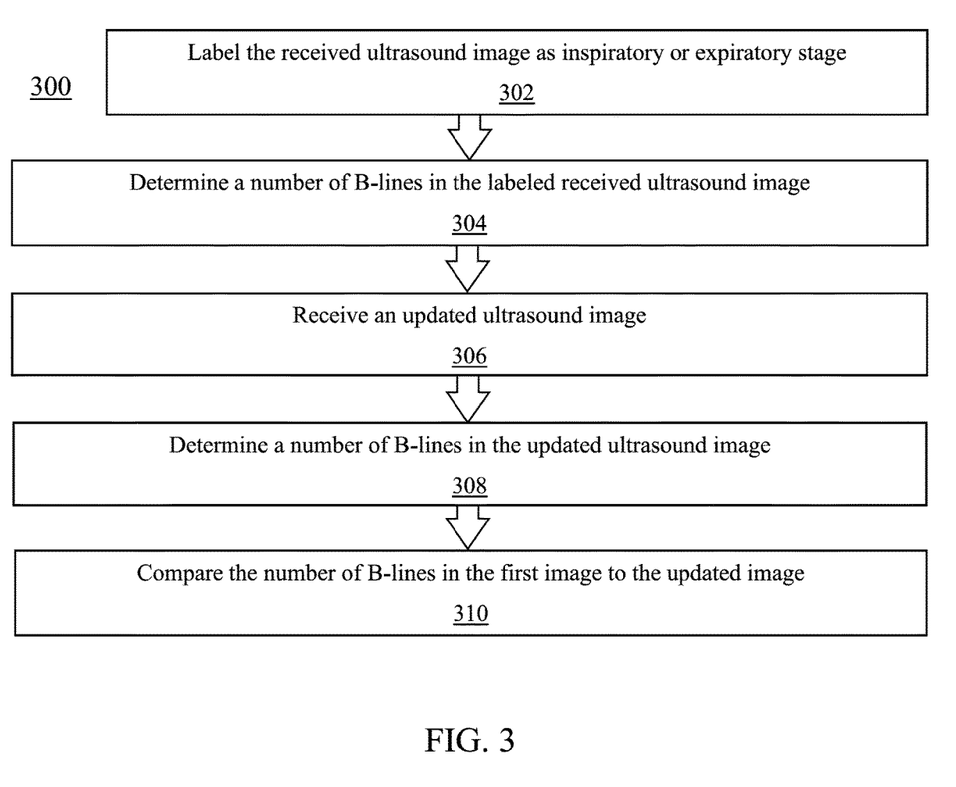
FIG. 3 is a flowchart of a method for monitoring a patient's lungs during ventilation using a lung injury monitoring system, in accordance with an embodiment.

Referring to FIG. 3, in one embodiment, is a flowchart 300 of a method for analysis of ultrasound imaging by the lung injury monitoring system, as described in step 112 of the method in FIG. 1. Referring to previous steps in method 100, an ultrasound image is obtained. For example, an ultrasound probe or patch is positioned to image a lung zone of interest, such as through manual or mechanical positioning. The image or images are acquired beginning from that position, and may cover one or more additional images. The current ventilator stage is also determined by the lung injury monitoring system using one of several possible mechanisms.

At step 302 of the method, the received ultrasound image is labeled as an inspiratory or expiratory ventilation stage image based on the determined ventilation phase of the ventilator. The image can be labeled or otherwise identified as inspiratory or expiratory ventilation stage image using any of a wide variety of possible mechanisms.

At step 304 of the method, the lung injury monitoring system determines a number of B-lines in the labeled received ultrasound image. For example, processor 220 of the lung injury monitoring system can be configured or designed to analyze the image and determine the number of B-lines in the image. According to an embodiment, the determined number of B-lines in the labeled received ultrasound image may comprise a maximum and/or an average number of B-lines in the image or in one or more images. The number of B-lines in the image can be determined using a variety of methods. According to one embodiment, the number of B-lines in the image is determined by training a convolutional neural network to detect B-lines in each ultrasound B-mode image of the buffer.

According to another embodiment, the lung injury monitoring system determines an appearance of one or more B-lines in the labeled received ultrasound image. For example, processor 220 of the lung injury monitoring system can be configured or designed to analyze the image and determine an appearance of B-lines in the image, where the appearance can be a parameter such as width of one or more B-lines. The appearance of B-lines in the image can be determined using a variety of methods. According to one embodiment, the appearance of B-lines in the image is determined by training a convolutional neural network to detect and measure B-lines in an ultrasound image.

At step 306 of the method, an ultrasound image is obtained. For example, an ultrasound probe or patch is positioned to image the same lung zone of interest, such as through manual or mechanical positioning. The ultrasound image is obtained in the inspiratory or expiratory ventilation phase of the ventilator, and the image is labeled as the inspiratory or expiratory ventilation phase of the ventilation. The image can be labeled or otherwise identified as inspiratory or expiratory ventilation stage image using any of a wide variety of possible mechanisms.

At step 308 of the method, the lung injury monitoring system determines a number or appearance of B-lines in the updated ultrasound image. For example, processor 220 of the lung injury monitoring system can be configured or designed to analyze the image and determine the number and/or appearance of B-lines in the updated ultrasound image. According to an embodiment, the determined number and/or appearance of B-lines in the updated ultrasound image may comprise a maximum and/or an average number of B-lines in the image or in one or more images. The number and/or appearance of B-lines in the updated ultrasound image can be determined using a variety of methods. According to one embodiment, the number and/or appearance of B-lines in the updated ultrasound image is determined by training a convolutional neural network to detect B-lines in each ultrasound B-mode image of the buffer.

At step 310 of the method, the number and/or appearance of determined B-lines in the labeled received ultrasound image is compared to the number and/or appearance of determined B-lines in the updated ultrasound image. For example, processor 220 of the lung injury monitoring system can be configured or designed to compare the number and/or appearances of determined B-lines between the two or more images, such as between an image in the inspiratory phase and an image in the expiratory phase. According to an embodiment, the comparison is utilized to determine, calculate, or identify a ratio of maximum (RM) and/or average (RA) number of B-lines in an inspiratory ventilation stage relative to an expiratory ventilation stage. According to an embodiment, this ratio is a metric indicative of VALI. According to an embodiment, the ratio is shared with a display module for display, combination with other metrics, and/or visualization.

According to an embodiment, the identified ratio is indicative of a potential VALI if the identified ratio is above a predetermined threshold, and wherein the identified ratio is indicative of a healthy lung if the identified ratio is below a predetermined threshold. For example, according to one embodiment such as for the detection or diagnosis of a potential risk of cyclic atelectasis, a B-line ratio of RM≤1 is mapped to low risk, a B-line ratio of RM≥2 to high risk, and intermediate ratios are mapped to corresponding intermediate risk levels, although other ranges and thresholds are possible. Alternatively, the risk level can be determined based on the percentage of respiratory cycles in which there is a substantial difference between $M_e$ (maximum number of B-lines per image frame during expiration) and $M_i$ (maximum number of B-lines per image frame during inspiration), where a "substantial difference" could be defined as cycles in which $M_e>3$ and $M_i<3$, although other ranges and thresholds are possible. Additionally, the absolute number of B-lines ($M_e$, $M_i$) can be used to determine or modify the risk level (e.g., increase if both $M_e$ and $M^i$ are >3), rather than or in conjunction with the ratio. According to another embodiment, the average number of B-lines per image frame during expiration ($A_e$) and inspiration ($A_i$), and the corresponding ratio RA can be used, as indicated in step 7 of FIG. 5.

According to an embodiment, a clinician can adjust or set or predetermine the B-line thresholds relative to determining or diagnosing lung injury or risk. For example, the clinician can determine what ratio or ratios are a low risk, what ratio or ratios are an intermediate risk, what ratio or ratios are a high risk, or any other ranges or thresholds. The clinician can do this at the beginning of ventilation, and the threshold determined or set by the clinician can be relative to other risk indicators or factors for the patient. For example, if a patient is high risk for lung injury, the clinician may adjust the thresholds or settings to allow for more sensitive risk identification by the lung injury monitoring system.

Figure 5:
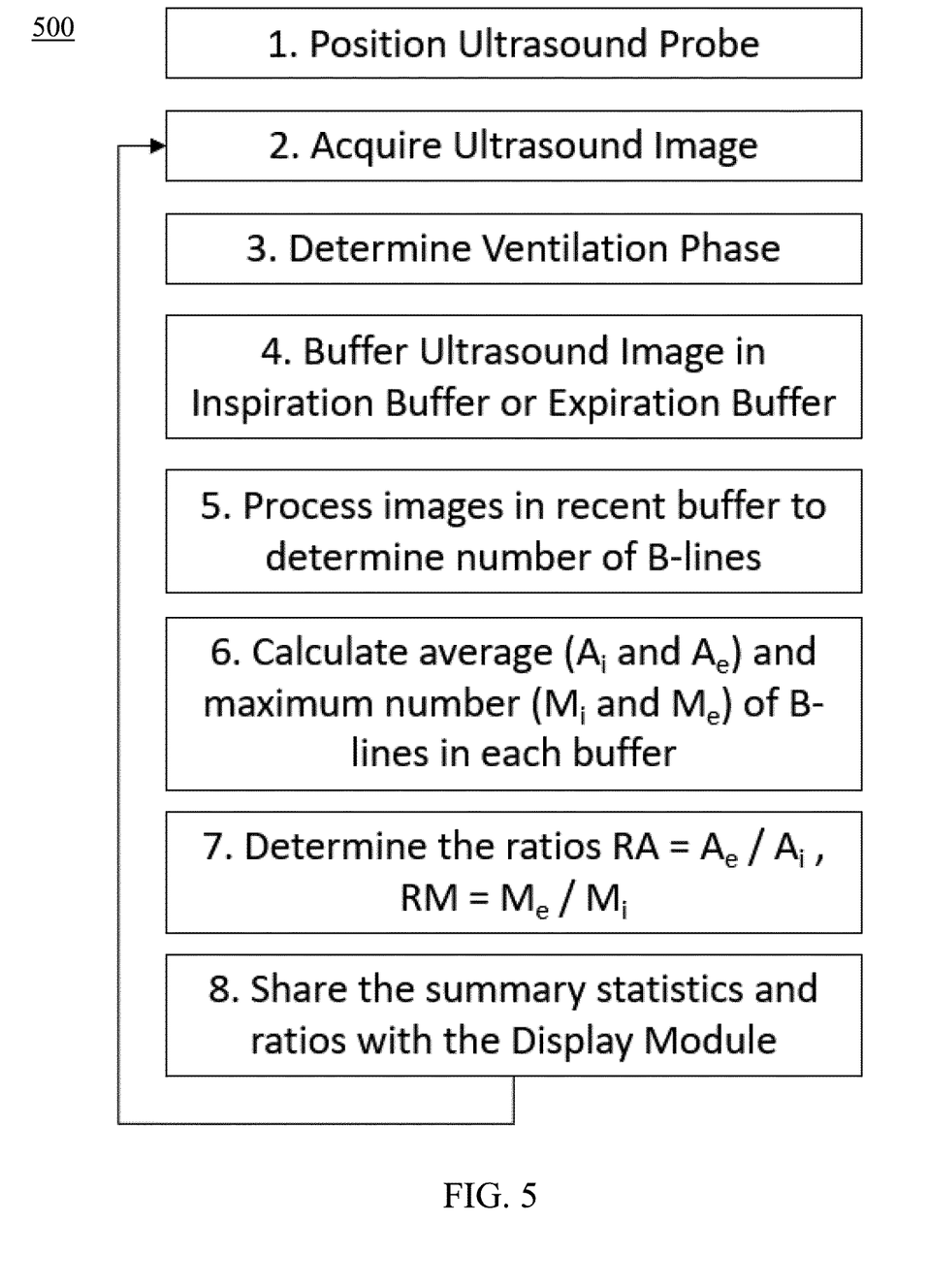
FIG. 5 is a flowchart of a method for monitoring a patient's lungs during ventilation using a lung injury monitoring system, in accordance with an embodiment.

Referring to FIG. 5, in embodiment, is a flowchart 500 of a method for analysis of ultrasound imaging by the lung injury monitoring system, as described in step 112 of the method in FIG. 1. The method depicted in flowchart 500 is an alternative visualization of the method depicted in flowchart 300.

Figure 4:
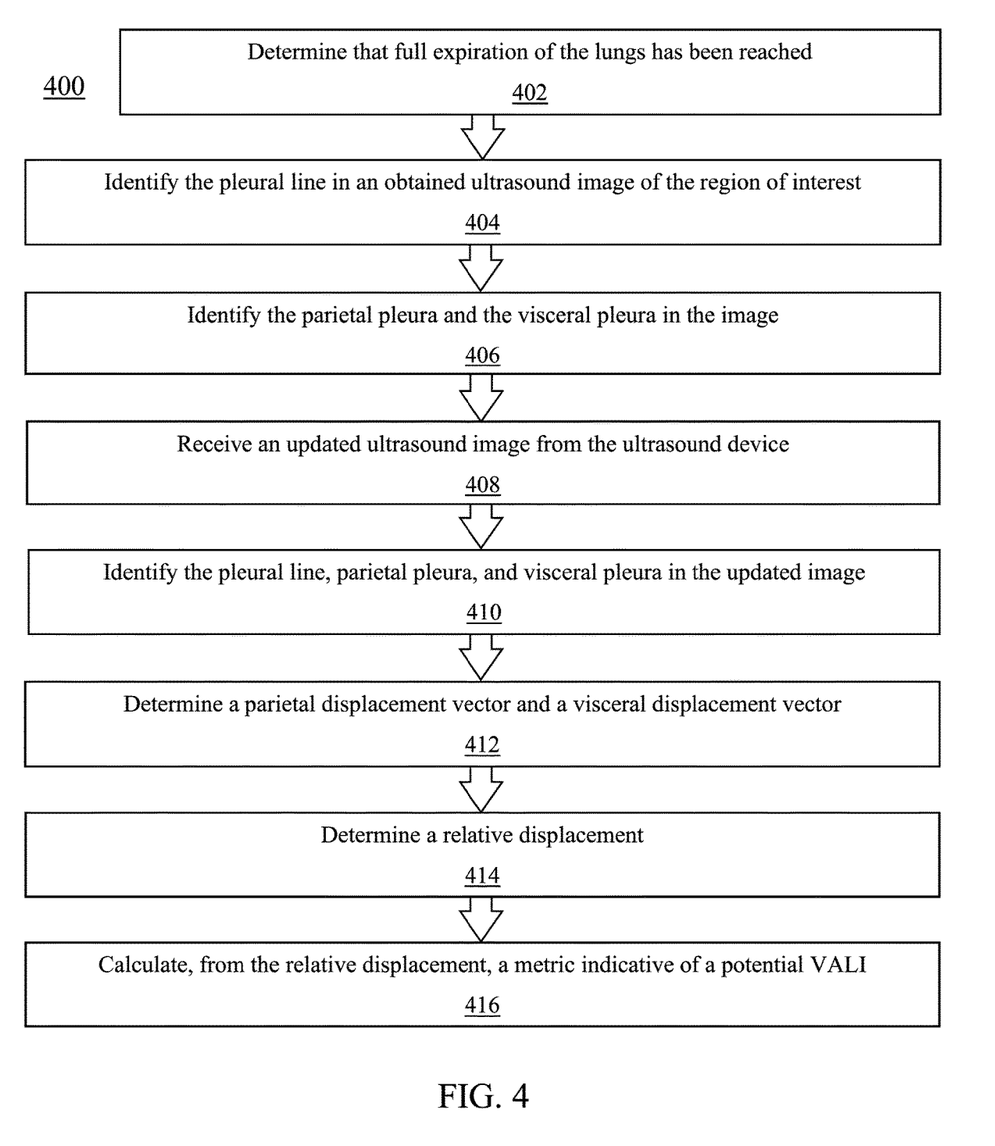
FIG. 4 is a flowchart of a method for monitoring a patient's lungs during ventilation using a lung injury monitoring system, in accordance with an embodiment.

Referring to FIG. 4, in one embodiment, is a flowchart 400 of a method for analysis of ultrasound imaging by the lung injury monitoring system, as described in step 112 of the method in FIG. 1. Referring to previous steps in method 100, an ultrasound image is obtained. For example, an ultrasound probe or patch is positioned to image a lung zone of interest, such as through manual or mechanical positioning. The image or images are acquired beginning from that position, and may cover one or more additional images. The current ventilator stage is also determined by the lung injury monitoring system using one of several possible mechanisms.

At step 402 of the method, ventilator system determines that full expiration of the patient's lungs have been reached. This can be done, for example, by monitoring signal from the ventilator, or via other mechanisms.

At step 404 of the method, using an ultrasound image captured when the ventilator system determines that full expiration of the patient's lungs have been reached, the lung injury monitoring system identifies a pleural line in the image. The pleural line can be identified using a variety of different mechanisms. According to one embodiment, the pleural line can be identified using convolutional neural networks (CNN) trained for detection of the pleural line. Alternatively, the system can utilize traditional image processing via filtering and thresholding of the hyperechoic pleural line region. If no pleural line is found in the current image, the system returns to a previous step of the method.

At step 406 of the method, if the pleural line is found in the lung ultrasound image, the system analyzes the image to identify the parietal pleura ($R_p$) and the visceral pleura ($R_v$) in the received ultrasound image. These regions of interest can be identified using a variety of different mechanisms.

At step 408 of the method, the system receives an updated ultrasound image ($I_j$) from the ultrasound device.

At step 410 of the method, the lung injury monitoring system analyzes the updated ultrasound image to identify a pleural line. The image is also analyzed to identify the region of interest (ROI) of the parietal pleura ($R_p$) and the visceral pleura ($R_v$) in the updated ultrasound image. These regions of interest can be identified using a variety of different mechanisms. According to one embodiment, the regions of interest can be identified using convolutional neural networks (CNN) trained for detection of these regions. Alternatively, the system can utilize traditional image processing via filtering and thresholding to identify the regions of interest.

At step 412 of the method, the lung injury monitoring system compares the parietal pleura ROI and visceral pleura ROI in the received ultrasound image to the parietal pleura ROI and visceral pleura ROI in the updated ultrasound image. Based on this comparison, the system determines a parietal displacement vector ($d_p$) and a visceral displacement vector ($d_v$). The apparent motion of the regions of interest are tracked using, for example, methods known in the art such as cross-correlation, to generate the displacement vectors. According to another embodiment, two ultrasound images are obtained and rather than identifying displacement relative to a baseline, the velocity of motion is determined by computing the change in relative displacement between the regions of interest in the two images.

At step 414 of the method, the system determines a relative displacement ($d_j$) by subtracting $d_p$ from $d_v$.

At step 416 of the method, the system utilizes the relative displacement ($d_j$) to calculate or determine a metric indicative of a potential ventilator-associated lung injury. There are several metrics that may be utilized, and several methods for calculating the metric. According to one embodiment, the system determines the ventilation phase, such as from a signal from the ventilator, and the ventilation phase is mapped onto an interval such as [0 . . . 2*π] for the full respiratory cycle (e.g. 0=full expiration, π=full inspiration, 2π=full expiration in next cycle). Then, the raw displacement values ($d_j$) are used to compute quantitative lung sliding parameters such as amplitude and velocity of the displacement as a function of the ventilation phase, as well as the phase lag. Amplitude is the maximum displacement within one respiratory cycle. Velocity is the displacement per time, and relevant derived summary statistics are maximum or average velocity per cycle. Phase lag is determined by calculating the time lags between the peak displacements and the peak inspiratory/expiratory ventilation phase. According to an embodiment, these determined parameters are metrics indicative of VALI. According to an embodiment, the determined parameter(s) is shared with a display module for display, combination with other metrics, and/or visualization.

According to an embodiment, the determined parameter(s) is indicative of a potential VALI if the identified ratio is above a predetermined threshold, and wherein the parameter is indicative of a healthy lung if the parameter is below a predetermined threshold. For example, according to one embodiment such as for the detection or diagnosis of a potential risk of overdistension, the lung sliding parameters can be scaled and thresholded to map the risk range from low to high. For the amplitude parameter, amplitudes of ≥10 mm can be mapped to low risk, and amplitudes of <1 mm can be mapped to high risk. The threshold and scaling can be adjusted for each zone and patient. In particular, the threshold can be scaled relative to the amplitude observed before or at the beginning of mechanical ventilation, such that any reduction in sliding amplitude (or velocity or phase lag) can be visualized as increased risk of overdistension.

Figure 6:
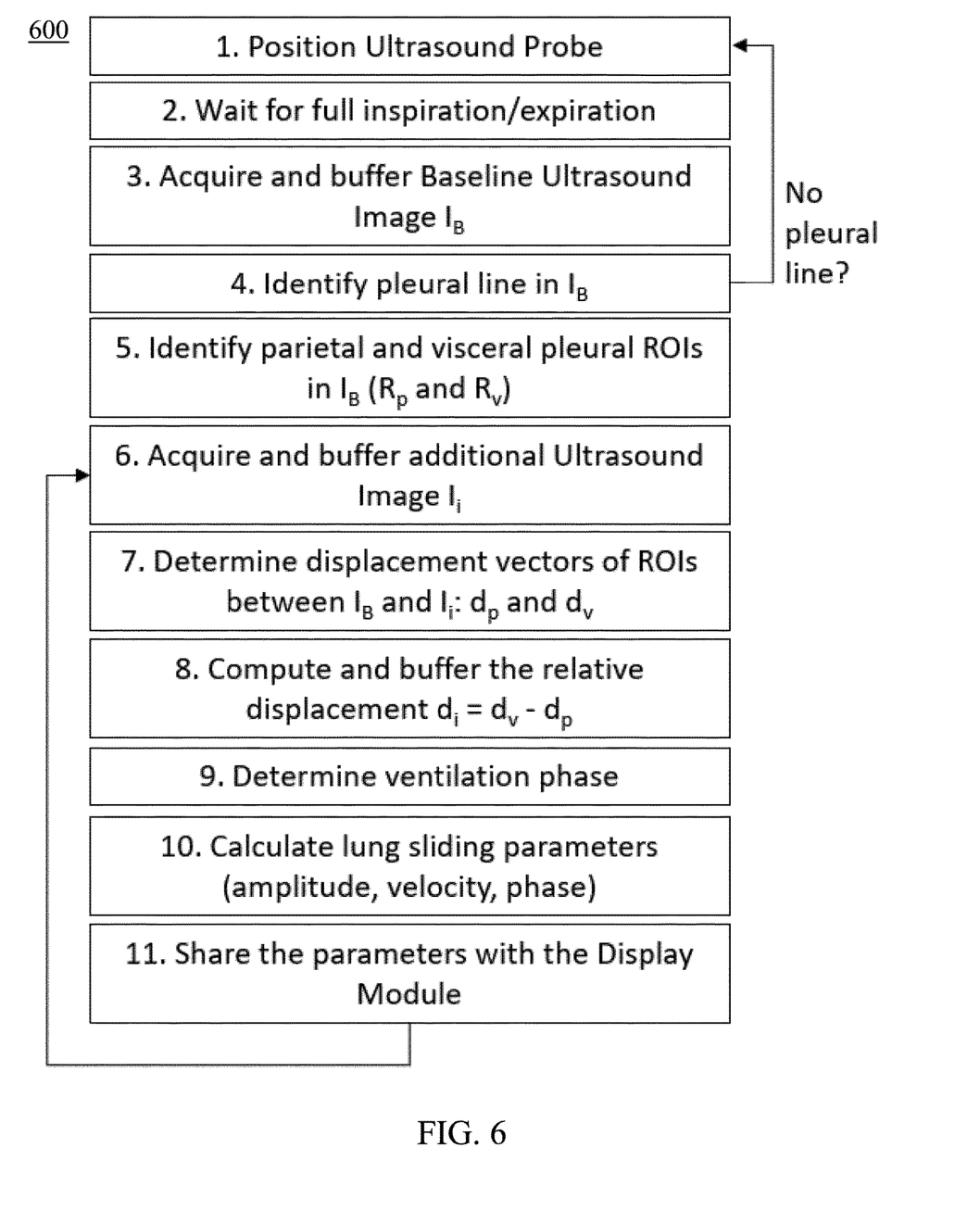
FIG. 6 is a flowchart of a method for monitoring a patient's lungs during ventilation using a lung injury monitoring system, in accordance with an embodiment.

Referring to FIG. 6, in embodiment, is a flowchart 600 of a method for analysis of ultrasound imaging by the lung injury monitoring system, as described in step 112 of the method in FIG. 1. The method depicted in flowchart 600 is an alternative visualization of the method depicted in flowchart 400.

Referring back to method 100 described with regard to FIG. 1, at optional step 116 of the method, the lung injury monitoring system displays or otherwise provides the identification, risk scoring, and/or diagnosis of the possible VALI using a user interface 240. The user interface may be any method or component sufficient to communicate the information to a user. According to an embodiment, the output from the ultrasound images analysis is processed and normalized to be displayed on a scale-such as from low to high—for one or more lung zones for which an ultrasound measurement was acquired. According to an embodiment, the VALI risk level can be displayed on the ultrasound system, the ventilation equipment, or on independent equipment including mobile devices, among other sources.

According to an embodiment, the lung injury monitoring system displays or otherwise provides the identification, risk scoring, and/or diagnosis of the possible VALI using a user interface 240, and/or displays or otherwise provides a recommendation based on the identification, risk scoring, and/or diagnosis of the possible VALI using the user interface. For example, the lung injury monitoring system may recommend or otherwise suggest a treatment or other action to minimize or otherwise treat or address a possible VALI. According to an embodiment, the lung injury monitoring system may recommend or otherwise suggest a treatment or other action to optimize patient ventilation. For example, the system may provide a recommendation to position the patient based on the local distribution of alveolar status. For example, if the left lobe of the lung has more over distended alveoli while the right is not receiving adequate ventilation, then the system can recommend positioning of the patient on their side such that the left part is on the bed or other surface. This enables the additional help of gravity to further help the opening of the alveoli in the right side (i.e., better tidal volume distribution). For example, body position-such as supine, prone, or lateral—can be guided by the local status of the alveoli in cases of heterogenous distributions, as determined by the lung injury monitoring system. Body positioning can thus be done on an objective manner as guided by quantification.

Figure 7:
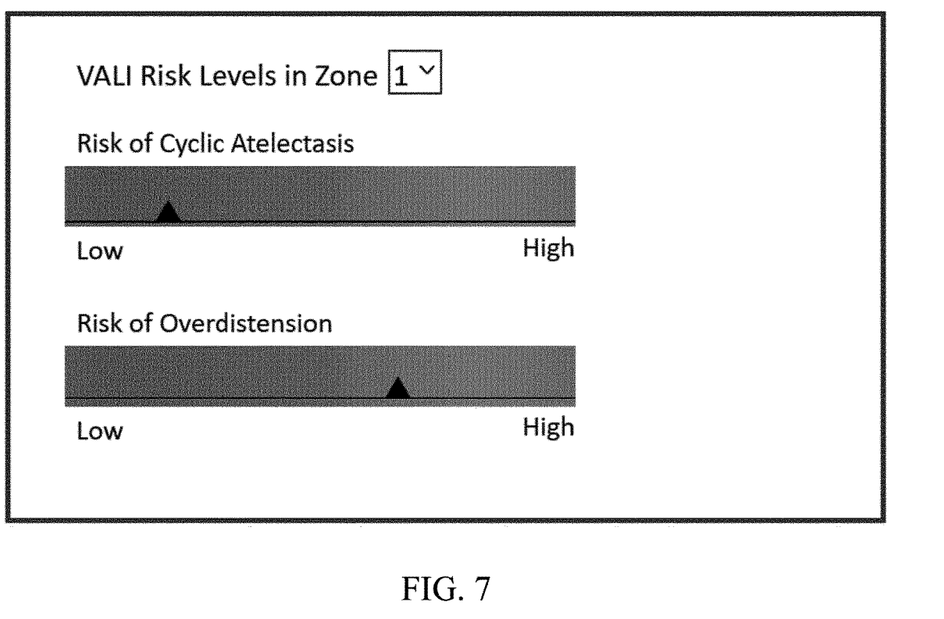
FIG. 7 is a schematic representation of a display for a ventilator system, in accordance with an embodiment.

Referring to FIG. 7, in one embodiment, is a possible example of a display providing an identification, diagnosis, risk scoring, or other information about a possible VALI. Pursuant to this embodiment, the output of methods 100, 300, and/or 400 are processed and normalized to be displayed on a scale—such as from low to high—for one or more lung zones for which an ultrasound measurement was acquired. The display may provide a visualization, identification, diagnosis, risk scoring, or other information about an individual lung zone, or the display may provide a visualization, identification, diagnosis, risk scoring, or other information about multiple lung zones, or the display may provide a visualization, identification, diagnosis, risk scoring, or other information combined for the entire lung.

Figure 8:
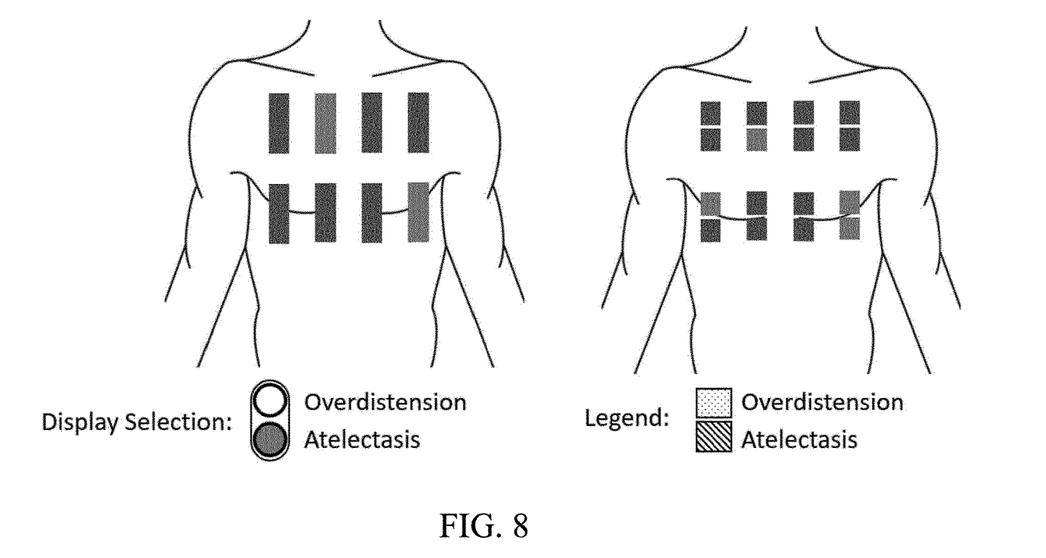
FIG. 8 is a schematic representation of a display for a ventilator system, in accordance with an embodiment.

Referring to FIG. 8, in one embodiment, is a possible example of a display providing an identification, diagnosis, risk scoring, or other information about a possible VALI. Pursuant to this embodiment, the output of methods 100, 300, and/or 400 are utilized to provide a visualization, identification, diagnosis, risk scoring, or other information about all lung zones simultaneously, mapped to the anatomical lung region in which the ultrasound data was obtained. The anatomical mapping is achieved by acquiring ultrasound data sequentially from different imaging zones and manually entering the zone number/location in which the data was acquired, or by following a pre-determined sequence of zone acquisitions, or by using methods to automatically determine the acquisition zones, or by obtaining data from multiple probes ("patches") positioned to image different lung zones. According to this embodiment, of which many variations are possible, the circles represent a radio button style selection of atelectasis or overdistension to be displayed. The squares at the bottom of the display represent a figure legend. The squares on the chest represent a risk level for one, two, or more VALI. For example, the upper color-coded boxes in the figure can represent an overdistension risk, and the lower boxes can represent an atelectasis risk. Many other risks and visualization options are possible.

Figure 9:
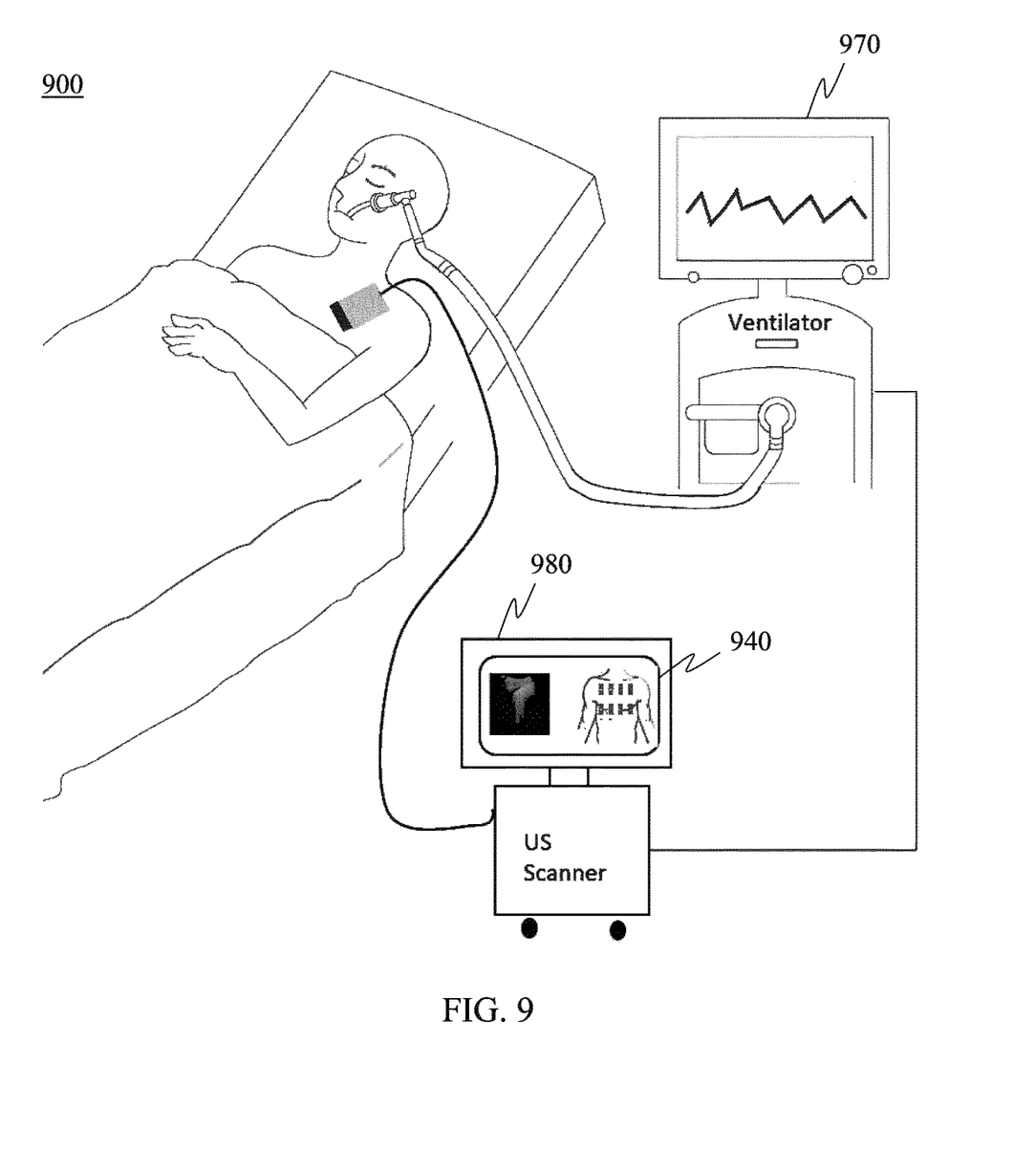
FIG. 9 is a schematic representation of a ventilator system, in accordance with an embodiment.

Referring to FIG. 9, in one embodiment, is a lung injury monitoring system 900. The lung injury monitoring system comprises a ventilator device 970 and ultrasound device 980. In this embodiment, the ultrasound device comprises a user interface 940 to communicate the output of the methods described or otherwise envisioned herein.

Many variations and embodiments of the lung injury monitoring system 200, and the method (e.g., the methods represented by flowcharts 100, 300, and 400) of its use are possible. For example, the ultrasound data can be combined with other clinical and/or demographic data to generate an even more accurate patient-specific VALI risk estimation. The clinical or demographic data can be any information that might influence, decrease, or increase a patient's risk of VALI. All ultrasound parameters can be combined for a joint risk prediction, for example using an algorithm trained to predict the risk using ground truth obtained from clinical data, CT, and/or other sources. Further, other ultrasound features such as static or dynamic air bronchograms can be used to modify the risk level.

According to another embodiment, the ultrasound data acquisition can include pleural strain measurements or surface wave velocity estimations. These data can be used in combination with lung sliding data or independently to generate or modify a VALI risk level indicator for overdistension.

According to another embodiment, the VALI risk can be recorded or tracked over time to assess lung healing progress, to use as quality control data, or many other uses. The risk may be combined with other clinical data about the patient as input for epidemiological statistics, among other uses.

According to another embodiment, the system can engage in longitudinal zone-wise tracking. For example, if a patient has been imaged before to set the initial ventilator settings, follow-up ventilator setting checks can utilize learnings from the earlier scans. For example, prior knowledge about the region(s) of the lungs exhibiting symptoms of cyclic atelectasis or volutrauma can be highlighted using the system or display. The user can then be guided to first image those regions to see if there are any changes, followed by imaging the other regions/zones to check if new areas of concern have started to develop. Each scan leads to a new data point that can be added to a longitudinal progress display or record for that patient. Changes over time in ultrasound parameters (e.g. RM) or risk level at each zone can be highlighted specifically, since this may indicate a change in the patient's status.

According to another embodiment, the system can optimize positive end-expiratory pressure (PEEP) and tidal volume (VT) or peak inspiratory pressure (PIP) for a patient. For example, a personalized selection of PEEP and VT across time could be achieved by the clinician. The method may be used at different PEEPs to provide a clinician with a global map of atelectasis as a function of PEEP. The optimal PEEP might be the one that reduces the absolute quantity of B-Lines at the beginning of inspiration at adequate ventilation. To decide on a tidal volume, at a fixed PEEP, different tidal volumes are administered, and a global map of lung sliding (or overdistension) is achieved as a function of VT. The VT with the least over distension based on the lung sliding at adequate ventilation would be set as the optimal VT. The clinician could reassess B-Lines and lung sliding with time to monitor patient improvement or worsening, and if needed apply the same process again to identify a new optimal ventilation point. Many other variations are possible.

Referring to FIG. 2 is a schematic representation of a lung injury monitoring system 200. System 200 may be any of the systems described or otherwise envisioned herein, and may comprise any of the components described or otherwise envisioned herein. It will be understood that FIG. 2 constitutes, in some respects, an abstraction and that the actual organization of the components of the system 200 may be different and more complex than illustrated.

According to an embodiment, system 200 comprises a processor 220 capable of executing instructions stored in memory 230 or storage 260 or otherwise processing data to, for example, perform one or more steps of the method. Processor 220 may be formed of one or multiple modules. Processor 220 may take any suitable form, including but not limited to a microprocessor, microcontroller, multiple microcontrollers, circuitry, field programmable gate array (FPGA), application-specific integrated circuit (ASIC), a single processor, or plural processors.

Memory 230 can take any suitable form, including a non-volatile memory and/or RAM. The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 200. It will be apparent that, in embodiments where the processor implements one or more of the functions described herein in hardware, the software described as corresponding to such functionality in other embodiments may be omitted.

User interface 240 may include one or more devices for enabling communication with a user. The user interface can be any device or system that allows information to be conveyed and/or received, and may include a display, a mouse, and/or a keyboard for receiving user commands. In some embodiments, user interface 240 may include a command line interface or graphical user interface that may be presented to a remote terminal via communication interface 250. The user interface may be located with one or more other components of the system, or may be located remote from the system and in communication via a wired and/or wireless communications network.

Communication interface 250 may include one or more devices for enabling communication with other hardware devices. For example, communication interface 250 may include a network interface card (NIC) configured to communicate according to the Ethernet protocol. Additionally, communication interface 250 may implement a TCP/IP stack for communication according to the TCP/IP protocols. Various alternative or additional hardware or configurations for communication interface 250 will be apparent.

Storage 260 may include one or more machine-readable storage media such as read-only memory (ROM), random-access memory (RAM), magnetic disk storage media, optical storage media, flash-memory devices, or similar storage media. In various embodiments, storage 260 may store instructions for execution by processor 220 or data upon which processor 220 may operate. For example, storage 260 may store an operating system 261 for controlling various operations of system 200.

It will be apparent that various information described as stored in storage 260 may be additionally or alternatively stored in memory 230. In this respect, memory 230 may also be considered to constitute a storage device and storage 260 may be considered a memory. Various other arrangements will be apparent. Further, memory 230 and storage 260 may both be considered to be non-transitory machine-readable media. As used herein, the term non-transitory will be understood to exclude transitory signals but to include all forms of storage, including both volatile and non-volatile memories.

While system 200 is shown as including one of each described component, the various components may be duplicated in various embodiments. For example, processor 220 may include multiple microprocessors that are configured to independently execute the methods described herein or are configured to perform steps or subroutines of the methods described herein such that the multiple processors cooperate to achieve the functionality described herein. Further, where one or more components of system 200 is implemented in a cloud computing system, the various hardware components may belong to separate physical systems. For example, processor 220 may include a first processor in a first server and a second processor in a second server. Many other variations and configurations are possible.

According to an embodiment, storage 260 of system 200 may store one or more algorithms, modules, and/or instructions to carry out one or more functions or steps of the methods described or otherwise envisioned herein. For example, the system may comprise, among other instructions or data, ventilation instructions 262, ultrasound instructions 263, analysis instructions 264, and/or reporting instructions 265, among many other possible instructions and/or data.

According to an embodiment, ventilation instructions 262 direct the system to operate the ventilator device 270 of the lung injury monitoring system 200, specifically to ventilate a patient. The ventilator device can be any device suitable to ventilate a patient for any reason requiring ventilation. One or more parameters of the ventilator device instructions can be set, adjusted, preprogrammed, or otherwise determined by a healthcare professional. Thus, the ventilation instructions 262 enable operation of the ventilation device to ventilate the patient.

According to an embodiment, ultrasound instructions 263 direct the system to operate the ultrasound device 280 of the lung injury monitoring system 200, specifically to obtain one or more ultrasound images of one or more regions of the patient's lungs. The ultrasound device can be any device suitable to obtain or otherwise receive an ultrasound image from the patient. One or more parameters of the ultrasound device can be set, adjusted, preprogrammed, or otherwise determined by a healthcare professional. Thus, the ultrasound instructions 263 enable operation of the ultrasound device to obtain and/or process ultrasound images.

According to an embodiment, analysis instructions 264 direct the system to analyze one or more received ultrasound images to derive an output such as an identification, diagnosis, risk scoring, and/or other information about a possible VALI. There are numerous embodiments of the analysis of the image by the system, and thus numerous embodiments of the analysis instructions 264. Several embodiments are described in greater detail herein, including with regard to flowcharts 300 and 400, although these are only examples of possible analysis. According to an embodiment, the result of the analysis directed by the analysis instructions 264 is a metric, ratio, or other data that enables identification, diagnosis, or risk scoring, analysis, or prediction of possible lung injury. This output can be utilized immediately or can be stored in local or remote storage for subsequent use.

According to an embodiment, reporting instructions 265 direct the system to generate and provide a report or visualization to a user via the user interface 240 of the lung injury monitoring system 200. The report or visualization comprises, for example, information about the identification, diagnosis, risk scoring, and/or other information about a possible VALI. The user interface may be any method or component sufficient to communicate the information to a user. According to an embodiment, the instructions may direct the system to display the information on the user interface or display of the system. The display may comprise the information about the identification, risk scoring, and/or diagnosis of the possible VALI, information about the patient, information about demographic data regarding the patient, information about monitoring or vital sign data regarding the patient, and/or other information. The report may be communicated by wired and/or wireless communication to another device. For example, the system may communicate the report to a mobile phone, computer, laptop, wearable device, and/or any other device configured to allow display and/or other communication of the report.

Accordingly, the ventilator system and method disclosed or otherwise envisioned herein provides numerous advantages over the prior art. Providing a ventilator system that enables identification, diagnosis, or risk scoring, analysis, or prediction of possible lung injury significantly improves patient outcomes and can even save lives.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A lung injury monitoring system configured to monitor a patient's lungs during ventilation, comprising:
   an ultrasound device configured to obtain an ultrasound image of the patient's lungs during ventilation of the patient;
   a processor configured to: (i) receive the obtained ultrasound image; (ii) determine a ventilation phase of the ventilator; (iii) analyze the received ultrasound image; and (iv) determine a risk score for a potential ventilator-associated lung injury (VALI); and
   a user interface configured to display the risk score of the potential VALI.

2. The system of claim 1, wherein analyzing comprises:
   labeling the received ultrasound image as an inspiratory or expiratory image based on the determined ventilation phase of the ventilator;
   determining a number of B-lines in the labeled received ultrasound image, wherein the determined number of B-lines in the labeled received ultrasound image comprises a maximum and/or average number of B-lines;
   receiving an updated ultrasound image in the other of an inspiratory or expiratory ventilation phase of the ventilator, and labeling the updated ultrasound image as the other of the inspiratory and expiratory ventilation phase of the ventilator;
   determining a number of B-lines in the updated ultrasound image, wherein the determined number of B-lines in the updated ultrasound image comprises a maximum and/or average number of B-lines; and
   comparing the number of determined B-lines in the labeled received ultrasound image to the number of determined B-lines in the updated ultrasound image to identify a ratio of maximum and/or average number of B-lines in an inspiratory ventilation stage relative to an expiratory ventilation stage, wherein the ratio is a metric indicative of VALI.

3. The system of claim 2, wherein the identified ratio is indicative of a potential VALI if the identified ratio is above a predetermined threshold, and wherein the identified ratio is indicative of a healthy lung if the identified ratio is below a predetermined threshold.

4. The system of claim 1, wherein analyzing comprises:
   determining, from the determined ventilation phase of the ventilator, that full expiration of the patient's lungs has been reached;
   identifying a pleural line in a received ultrasound image after full expiration of the patient's lungs has been reached;
   identifying, if a pleural line is identified, a parietal pleura ($R_p$) and a visceral pleura ($R_v$) in the received ultrasound image;
   receiving, from the ultrasound device, an updated ultrasound image;
   identifying a pleural line in the updated ultrasound image and identifying a parietal pleura ($R_p$) and a visceral pleura ($R_v$) in the updated ultrasound image;
   determining, by comparing the parietal pleura and visceral pleura in the received ultrasound image and updated ultrasound image, a parietal displacement vector ($d_p$) and a visceral displacement vector ($d_v$);
   determining a relative displacement ($d_i$) by subtracting $d_p$ from $d_v$;
   calculating, from $d_i$, a metric indicative of VALI.

5. The system of claim 4, wherein calculating comprises determining a quantitative lung sliding parameter such as amplitude, velocity, or phase lag of displacement.

6. The system of claim 1, wherein the VALI is atelectotrauma and/or overdistension.

7. The system of claim 1, wherein the user interface is further configured to display one or more of monitoring or demographic information about the patient.

8. A method for monitoring a patient's lungs during ventilation using a lung injury monitoring system, comprising:
   receiving, from an ultrasound device of the lung injury monitoring system, an ultrasound image of the patient's lungs during ventilation of the patient by a ventilator of the lung injury monitoring system;
   determine, by a processor of the lung injury monitoring system, a ventilation phase of the ventilator;
   analyze, using the processor of the lung injury monitoring system, the received ultrasound image; and
   determine, based on the analysis, a risk score for a potential ventilator-associated lung injury (VALI).

9. The method of claim 8, wherein analyzing the received ultrasound image comprises:
   labeling the received ultrasound image as an inspiratory or expiratory image based on the determined ventilation phase of the ventilator;
   determining a number of B-lines in the labeled received ultrasound image, wherein the determined number of B-lines in the labeled received ultrasound image comprises a maximum and/or average number of B-lines;
   receiving an updated ultrasound image in the other of an inspiratory or expiratory ventilation phase of the ventilator, and labeling the updated ultrasound image as the other of the inspiratory and expiratory ventilation phase of the ventilator;
   determining a number of B-lines in the updated ultrasound image, wherein the determined number of B-lines in the updated ultrasound image comprises a maximum and/or average number of B-lines; and
   comparing the number of determined B-lines in the labeled received ultrasound image to the number of determined B-lines in the updated ultrasound image to identify a ratio of maximum and/or average number of B-lines in an inspiratory ventilation stage relative to an expiratory ventilation stage, wherein the ratio is a metric indicative of VALI.

10. The method of claim 9, wherein the identified ratio is indicative of a potential VALI if the identified ratio is above a predetermined threshold, and wherein the identified ratio is indicative of a healthy lung if the identified ratio is below a predetermined threshold.

11. The method of claim 8, wherein analyzing the received ultrasound image comprises:
   determining, from the determined ventilation phase of the ventilator, that full expiration of the patient's lungs has been reached;
   identifying a pleural line in a received ultrasound image after full expiration of the patient's lungs has been reached;
   identifying, if a pleural line is identified, a parietal pleura ($R_p$) and a visceral pleura ($R_v$) in the received ultrasound image;
   receiving, from the ultrasound device, an updated ultrasound image;
   identifying a pleural line in the updated ultrasound image and identifying a parietal pleura ($R_p$) and a visceral pleura ($R_v$) in the updated ultrasound image;
   determining, by comparing the parietal pleura and visceral pleura in the received ultrasound image and updated ultrasound image, a parietal displacement vector ($d_p$) and a visceral displacement vector ($d_v$);
   determining a relative displacement ($d_i$) by subtracting $d_p$ from $d_v$;
   calculating, from $d_i$, a metric indicative of VALI.

12. The method of claim 11, wherein calculating comprises determining a quantitative lung sliding parameter such as amplitude, velocity, or phase lag of displacement.

13. The method of claim 8, wherein the VALI is atelectotrauma and/or overdistension.

14. The method of claim 8, further comprising displaying, via a user interface of the lung injury monitoring system, the risk score of the potential VALI.

15. The method of claim 14, further comprising displaying via a user interface of the lung injury monitoring system, one or more of monitoring or demographic information about the patient.

* * * * *